United States Patent [19]

Tanaka et al.

[11] Patent Number: 5,410,201
[45] Date of Patent: Apr. 25, 1995

[54] ELECTRIC MOTOR

[75] Inventors: Tetsuya Tanaka; Toshio Tatsutani; Toshihiko Horii; Yuzi Serizawa, Nakatsugawa, all of Japan

[73] Assignee: Mitsubishi Denki Kabushiki Kaisha, Tokyo, Japan

[21] Appl. No.: 186,705

[22] Filed: Jan. 25, 1994

Related U.S. Application Data

[62] Division of Ser. No. 708,884, May 30, 1991, Pat. No. 5,319,270.

[30] Foreign Application Priority Data

| Jun. 1, 1990 | [JP] | Japan | 2-58015 U |
| Jun. 6, 1990 | [JP] | Japan | 2-147696 |
| Oct. 11, 1990 | [JP] | Japan | 2-272676 |
| Nov. 8, 1990 | [JP] | Japan | 2-302939 |

[51] Int. Cl.$^6$ .................. H02K 11/00; H02K 21/12
[52] U.S. Cl. ................... 310/68 B; 310/67 R; 310/156
[58] Field of Search .......... 310/67 R, 68 B, 68 R, 310/156, 191

[56] References Cited

U.S. PATENT DOCUMENTS

| 4,286,184 | 8/1981 | Kogler et al. | 310/67 R |
| 4,371,821 | 2/1983 | Laesser et al. | 310/49 R |
| 4,575,652 | 3/1986 | Gogue | 310/67 R |
| 4,578,606 | 3/1986 | Welterlin | 310/68 R |
| 4,620,301 | 10/1986 | Koide | 360/105 |
| 4,698,542 | 10/1987 | Muller | 310/67 R |
| 4,701,653 | 10/1987 | Merkle et al. | 310/71 |
| 4,968,913 | 11/1990 | Sakamoto | 310/156 |
| 5,028,216 | 7/1991 | Harmsen et al. | 417/354 |
| 5,075,605 | 12/1991 | Hendricks et al. | 310/156 |

FOREIGN PATENT DOCUMENTS

| 0104382 | 4/1984 | European Pat. Off. |
| 0149228 | 12/1984 | European Pat. Off. |
| 0170742 | 2/1986 | European Pat. Off. |
| 0200537 | 11/1986 | European Pat. Off. |
| 0509635 | 10/1992 | European Pat. Off. |
| 1200931 | 9/1965 | Germany |
| 3327123 | 2/1984 | Germany |
| 3331755 | 3/1984 | Germany |
| 3434965 | 4/1985 | Germany | 310/156 |
| 8702998 | 2/1987 | Germany |
| 3603063 | 8/1987 | Germany |

(List continued on next page.)

OTHER PUBLICATIONS

Patent Abstracts of Japan "Brushless Motor With Built--In Magnetic Encoder" E-571 Jan. 9, 1988, vol. 12/No. 7.

(List continued on next page.)

Primary Examiner—Steven L. Stephan
Assistant Examiner—Clay LaBalle

[57] ABSTRACT

An electric motor used for example in a magnetic disk drive, comprises a rotor having a hub on which the magnetic disk is mounted, and an annular driving permanent magnet, and rotating together with a rotary shaft, and a stator disposed outside the rotor, having a core and coils wound on the core. A signaling permanent magnet for detecting the rotary angle or the rotational speed of the rotor may be provided on the radially inner side of the driving permanent magnet. Part of the outer periphery of the stator core may be retracted radially inward or cut away to form a concavity or an open part. A magnetic shielding plate may further be provided to cover the coils, with part or the entirety of the magnetic shielding plate being positioned closer to the rotary shaft than the outermost periphery of the rotor to prevent the escape of the rotor in the direction of the rotary shaft. The stator core may be provided, at its inner extremities, bent portions extending in the direction parallel with the rotary shaft, and away from the hub. Alternatively, the midpoint of the stator core may be positioned farther away from the hub than the midpoint of the driving permanent magnet.

7 Claims, 14 Drawing Sheets

FOREIGN PATENT DOCUMENTS

| | | |
|---|---|---|
| 3931257 | 4/1990 | Germany . |
| 61-52146 | 3/1986 | Japan ................................ 310/156 |
| 62-166760 | 7/1987 | Japan . |
| 63-18951 | 1/1988 | Japan . |
| 63-220757 | 9/1988 | Japan ................................ 310/156 |
| 1-206860 | 8/1989 | Japan ................................ 310/156 |
| 1130116 | 10/1968 | United Kingdom . |
| 1131936 | 10/1968 | United Kingdom . |
| 2004706 | 4/1979 | United Kingdom . |
| 2027285 | 2/1980 | United Kingdom . |
| 2180413 | 3/1987 | United Kingdom . |
| 2213327 | 8/1989 | United Kingdom . |

OTHER PUBLICATIONS

Patent Abstracts of Japan "Brushless Motor" E-643 Aug. 5, 1988, vol. 12 No. 287.

Patent Abstracts of Japan "Brushless Motor" E-808 Aug. 18, 1989, vol. 13 No. 374.

JP 61-135 353 A. In: Patents Abstracts of Japan, Sec. E. vol. 10 (1986) Nr. 329 (E-452).

JP 54-94 610 A. In: Patents Abstracts of Japan, Sec. E, vol. 3 (1979) Nr. 117 (E-141).

JP 2-46 151 A. In: Patents Abstracts of Japan, Sec. E, vol. 14 (1990) Nr. 210 (E-922).

F I G. 12
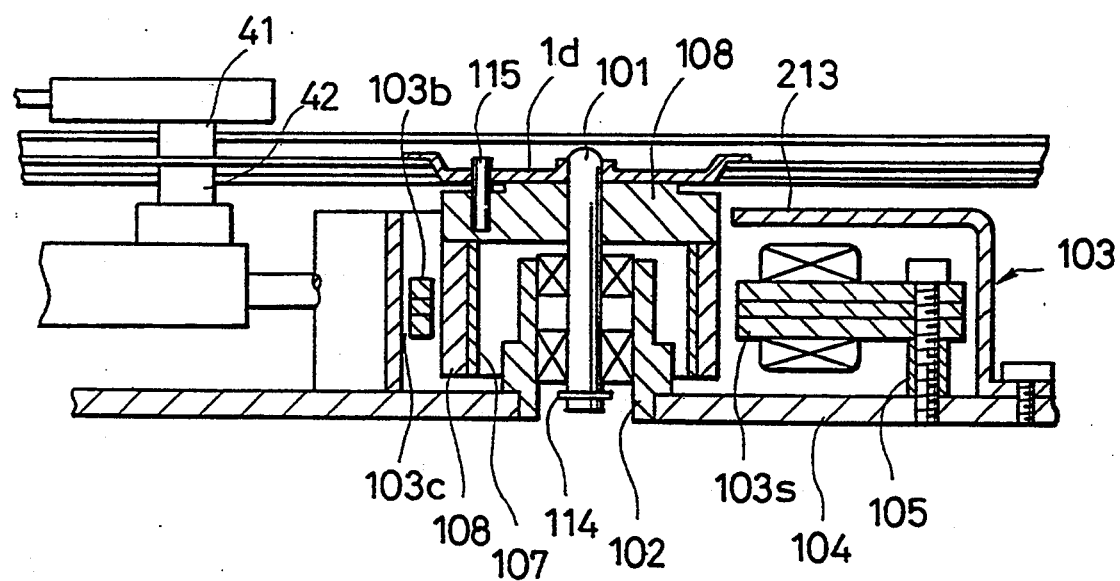

5,410,201

ELECTRIC MOTOR

This application is a divisional of application Ser. No. 07/708,884, filed on May 30, 1991, now U.S. Pat. No. 5,319,270, the entire contents of which are hereby incorporated by reference.

FIELD OF THE INVENTION

The present invention relates to an electric motor, and more particularly to an electric motor for rotating a recording medium such as a magnetic disk in a magnetic recording device for writing and reading magnetic recording signals in and from the recording medium.

BACKGROUND OF THE INVENTION

Examples of conventional electric motors of this type are shown for example in Japanese Utility Model Kokai Publication No. 135863/1985 and Japanese Utility Model Kokai Publication No. 104779/1986. These will be explained with reference to FIG. 1, FIG. 2, and FIG. 3.

Referring first to FIG. 1 and FIG. 2, a magnetic disk 1 for recording information is held by a hub 16, which is fitted with and fixed to a rotary shaft 17. A magnetic disk 1 comprises a recording sheet 1a, a center hub 1d connected to the recording sheet 1a, outer case comprising an upper wall 1b and a lower wail 1c for protecting the sheet 1a.

The center hub 1d of the magnetic disk 1 is provided with an aperture 1c through which an upper end of the rotary shaft 17 extends. A drive pin 15 is fixed to the hub 16 at a certain distance from the axis of the shaft 17, and is engageable with an aperture if provided in the center hub 1d of the magnetic disk 1. The drive pin 15 transmits the rotation of the shaft 17 and the hub 16 to the magnetic disk 1. In this way, the hub 16 and the drive ping 15 in combination hold and rotate the magnetic disk 1.

The rotary shaft 17 is rotatably supported with a pair of ball-bearings 11 at both axial ends of the cylindrical bearing holder 19. Fixed to the outside of the bearing holder 19 is a stator 20 having a core 8, which comprises an annular part 8a and a plurality of tooth portions 8b, on which coils 21 are wound. The core 8 and the cylindrical bearing holder 19 are fixed to a frame 18 by means of screws 14.

Fixed by a screw 6 to a first (lower as seen in FIG. 1) end of the rotary shaft 17, the end opposite to the hub 16 is a generally cup-shaped yoke 23 having a disk-shaped bottom wall 23a and a cylindrical side wall 23b having its first (lower as seen in FIG. 1) end connected to the outer periphery of the disk-shaped bottom 23a. Fixed to the inner surface of the side wall 23b of the yoke 23 is a driving permanent magnet 22 having magnetic poles facing the outer ends of the tooth portions 8b of the core 8. The yoke 23 and the permanent magnet 22 form a rotor 24.

The driving permanent magnet 22 emanates magnetic lines of force radially inward. By the interaction of the magnetic lines of force and the electric current through the coils 21, a rotating torque is generated, by which the rotor 22 is rotated.

An index detecting element 25 generates, In cooperation with an index detecting magnet 26, a pulse every revolution.

As shown in FIG. 3, a signaling permanent magnet (FG (frequency generator) magnet) 27 for detecting the rotary angle and the rotating speed (the number of revolutions per a unit time) of the rotor 24 may be mounted to an end of the driving permanent magnet 22, at the upper edge of the side wall 23b of the yoke 23. The frame 28 of this example of FIG. 3 also serves as a circuit board, on which a detecting circuit pattern 29 is formed at the location confronting the signaling permanent magnet 27. The circuit pattern 29 has a size substantially equal to the signaling permanent magnet 27, and generates an FG output signal in time with the rotation of the rotor 24.

The above-described electric motor is of the outer-rotor type in which the driving permanent magnet 22 of the rotor 24 is positioned outside the stator 20. The magnetic flux from the index detecting magnet 26 is detected by the index detecting element 25, and on the basis thereof, the current through the coils 21 is controlled.

Magnetic heads 41 and 42 are mounted to the frame 18 by means of a mounting structure, which includes a supporting shaft 43 and a sliding block 44. They are so supported that they are capable of translation movement in the radial direction of the magnetic disk 1.

In the above-described conventional electric motor, the rotor 24 is on the outside so when it Is contemplated to reduce the thickness of the electric motor and the magnetic recording device in which the electric motor is built, magnetic interferences between the permanent magnet 22 of the rotor 24, and the magnetic heads 41 and 42 and other components of the recording device problematical. The interferences can be eliminated or reduced by use of the inner rotor type In which the rotor 24 is positioned inside the stator 20, but the conventional FG detecting system shown in FIG. 3 cannot be adapted in the electric motor of the inner-rotor type.

Moreover, since the magnetic heads 41 and 42 move in the radial direction of the magnetic disk, they cannot be disposed in the plane of the rotor 24. This also imposes a limitation to the reduction of the thickness of the magnetic recording device.

Furthermore, the frame 18 and the bearing holder 19 are interposed between the stator 20 and the rotor 24 on one hand, and the magnetic disk and the magnetic heads, on the other hand. This imposes a further limitation to the reduction in thickness of the electric motor. If an electric motor of the inner-rotor type is employed the above problem can be solved. But, the rotation of the rotor 24 is accompanied with the so-called thrust force In the direction of the rotary shaft. When the thrust force Is excessive, the entire rotor is shifted upward in the direction of the rotary shaft. This makes It impossible to rotate the magnetic disk to rotate at a proper height (position along the shaft), adversely affecting the recording and playback.

SUMMARY OF THE INVENTION

An object of the invention is to provide an electric motor of the inner rotor type which can contribute to the reduction in the thickness of the magnetic recording device.

Another object of the present invention is to provide a thin electric motor which can restrain the thrust force in the direction of the rotary shaft due to the rotation of the rotor.

An electric motor according to one aspect of the invention comprises:

a rotary shaft that is rotatably supported;

a rotor having an annular driving permanent magnet generating a magnetic flux In the radial direction, and rotating together with said rotary shaft;

a stator disposed outside the rotor, having a core and a plurality of coils wound on the core, and generating a rotating torque for the rotor by the interaction with the driving permanent magnet; and a signaling permanent magnet for detecting the rotary angle or the rotational speed of the rotor;

wherein said signaling permanent magnet is provided on the radially inner side of the driving permanent magnet.

With the above arrangement, the signaling permanent magnet for detecting the rotation of the rotor is provided inside the driving permanent magnet of the rotor. As a result, it is possible to reduce the dimension (thickness) in the direction of the rotary shaft of the electric motor, and the resultant electric motor is of the inner rotor type which can contribute to the reduction in the thickness of the magnetic recording device.

An electric motor according to another aspect of the invention comprises:

a rotary shaft that is rotatably supported;

a rotor having an annular driving permanent magnet generating a magnetic flux in the radial direction, and rotating together with said rotary shaft; and a stator disposed outside the rotor, having a core and a plurality of coils wound on the core, and generating a rotating torque for the rotor by the interaction with the driving permanent magnet;

wherein part of the outer periphery of said core of said stator is retracted radially inward to form a concavity; and said coil is not provided at the part of the stator corresponding to the concavity.

In a modification, in place of the core being retracted, part of the core of said stator is open; and said coil is not provided at the part of the stator corresponding to the open part.

With the above arrangements, the core of the stator is radially retracted or open, so the line of movement of the magnetic heads can be aligned with the concavity or open part of the core, and the magnetic heads and other components can be accommodated within the plane of the rotor and the stator, and it is therefore possible to reduce the thickness of the magnetic recording device.

An electric motor according to a further aspect of the invention comprises a rotor which has a permanent magnet generating a magnetic flux In the radial direction, fixed to a rotary shaft which is held rotatably and vertically with respect to a frame, and which is provided with a hub which holds and rotates a disk-shaped recording medium; and a stator disposed outside the rotor, having a core and a plurality of coils wound on the core to generate a magnetic flux in the radial direction, and generating a rotating torque for the rotor by the interaction with the driving permanent magnet;

wherein part of the outer periphery of said core of said stator is retracted radially Inward or is cut away to form a concavity or an open part where the coils are not provided; and said stator is provided with a magnetic shielding plate covering the plurality of the coils from above, part or the entirety of said magnetic shielding plate being positioned closer to the rotary shaft than the outermost periphery of the rotor to prevent the escape of the rotor in the direction of said rotary shaft.

The magnetic shielding plate may be provided with protrusions positioned closer to the rotary shaft than the outermost periphery of the rotor. The protrusions may be bent into the direction away from the hub.

With the above arrangement, part or the entirety of the inner periphery of the magnetic shielding plate is positioned closer to the rotary shaft than the outermost periphery, so that the magnetic shielding plate serves to prevent the rotor from escaping In the direction of the shaft.

An electric motor according to a further aspect of the invention comprises:

a rotary shaft rotatably supported;

a rotor rotating together with said rotary shaft, and provided with an annular driving permanent magnet generating magnetic field in the radial direction from its outer periphery; and a stator positioned outside of said rotor, having a core, provided, at the extremity of the inner periphery of the core, bent portions extending in the direction parallel with the rotary shaft, and having a plurality of coils wound on the core.

With the above arrangement, the bent portions extending in the direction of the bearing are provided at the extremity of the inner periphery of the stator core. As a result, the area of the stator core facing the rotor magnet is increased, and the magnetic resistance of the air gap between the stator core and the rotor magnet is lowered. Accordingly, there will be more magnetic flux is in the air gap, and a greater torque. Moreover, due to the magnetic attracting force between the rotor and the stator, a certain force acts on the rotor in the direction of the bearing, and the thrust force in the direction of the rotary shaft due to the rotation of the rotor can be restrained.

In an alternative arrangement, the midpoint of the stator core is farther away from the hub than the midpoint of the driving permanent magnet.

With this arrangement, due to the magnetic attracting force between the rotor and the stator, a certain force acts on the rotor in the direction away from the hub to counteract the thrust force due to the rotation of the rotor can be restrained. The rotary shaft is therefore kept from shifting in the direction of its length.

BRIEF DESCRIPTION OF THE DRAWINGS

FIG. 12 is a sectional view of an electric motor incorporated in a magnetic recording device.

DETAILED DESCRIPTION OF THE PREFERRED EMBODIMENTS

Figure 1:
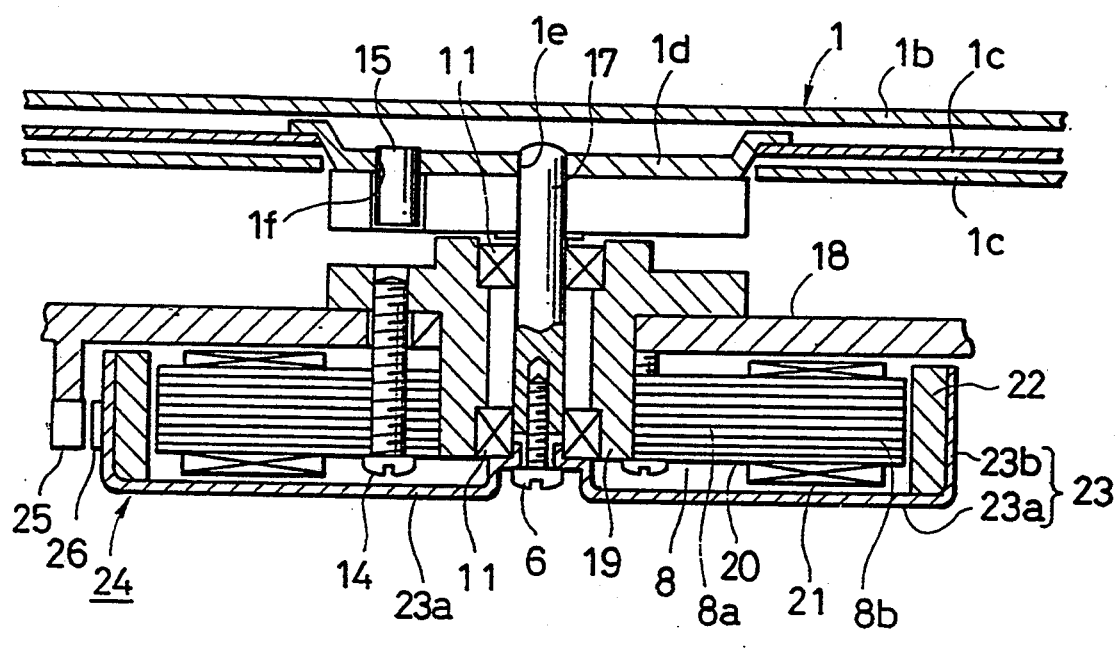
FIG. 1 is a sectional view of a conventional electric motor.
Figure 2:
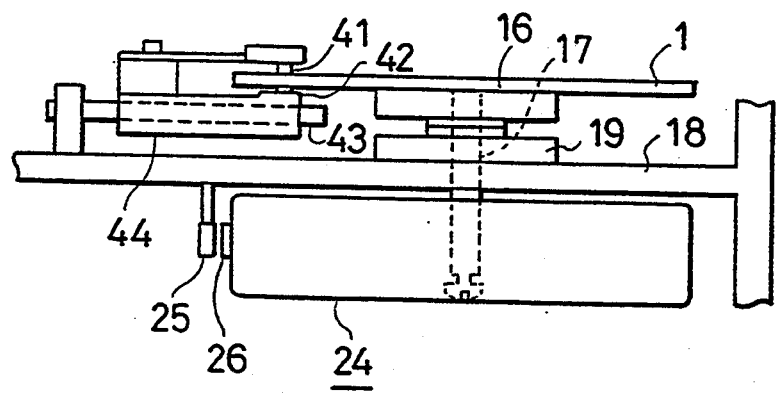
FIG. 2 is a side view of the conventional electric motor.
Figure 3:
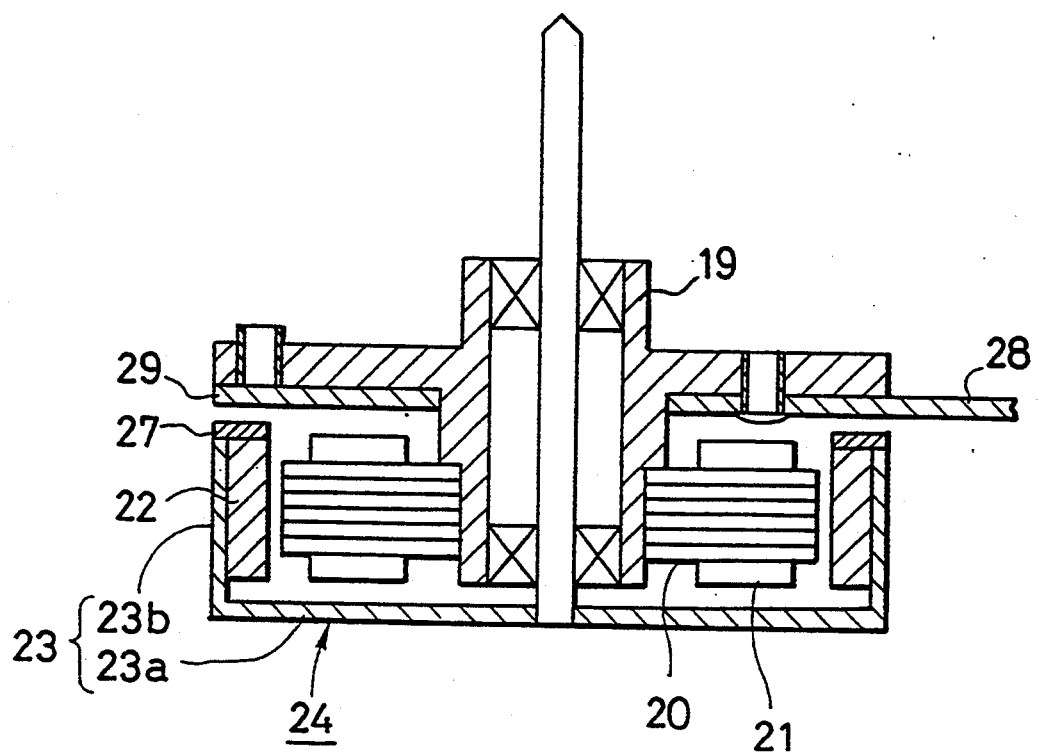
FIG. 3 is a sectional view of another electric motor in the prior art.
Figure 4:
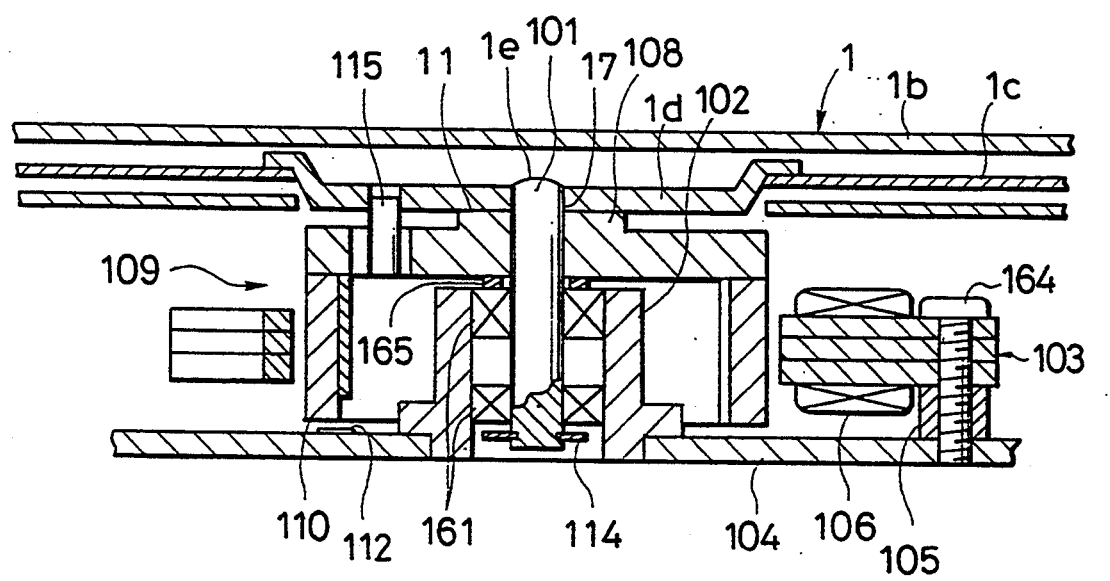
FIG. 4 is a sectional view of an electric motor of an embodiment of the invention.
Figure 5:
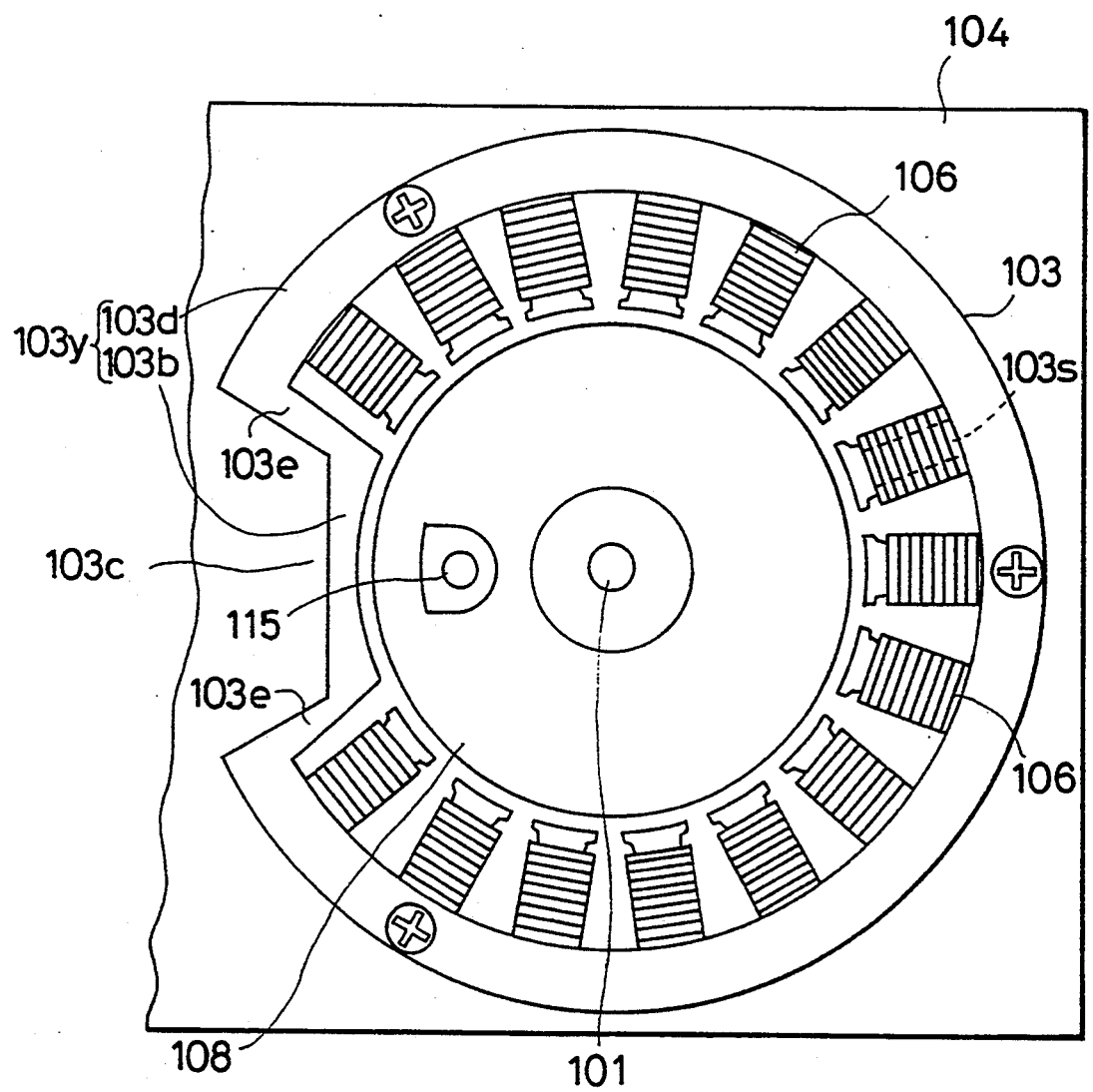
FIG. 5 is a plan view of the electric motor.

FIG. 4 to FIG. 8 show an embodiment of the invention, which is an electric motor of the inner rotor type in which the rotor is inside the stator. As illustrated, a rotary shaft 101 is rotatably supported by means of ball bearings 161 by a bearing holding member 102. The bearing holding member 102 is fixed vertically to a flat motor frame 104, which also serves as a circuit board.

A stator 103 is fixed to the motor frame 104. The stator 103 comprises a core 103a formed of laminated sheets of a metallic ferromagnetic material, and comprises a generally annular part 103y and a plurality of tooth portions 103s extending radially inward from the inner periphery of the annular part 103y. The stator 103 has a larger diameter part 103d which extends over the region of of about 15/18 of the entire circumference.

In the region of about 3/18 of the entire circumference, the annular part 103y is indented inward to form a concavity 103c. More specifically, it comprises an smaller diameter part 103b with its inner surface aligned with the inner ends of the tooth portions 103s and a pair of connecting portions 103e extending radially to connect the ends of the smaller diameter portion 103b and the larger diameter portion 103d.

The tooth portions 103s extend inward from the inner surface of the larger diameter portion 103d of the annular part 103y. The circumference of the larger diameter portion 103d is equally divided into a number which is a multiple of "3", e.g., 15 sectors, and the tooth portions 103s are disposed in the respective sectors being equidistanced from each other.

Coils 106 are wound on the respective tooth portions 103s. The coils 106 are divided into three groups each consisting of coils 106 wound on every third tooth portions 103s. The coils 106 belonging to the same group are connected to each other, and the three groups of coils 106 in combination form a three-phase winding. Each of the three groups of coils 106 are supplied with a current for 120° in accord with the rotational angle of the rotor to generate a rotating torque in the same direction.

The stator 103 is fixed by screws 164 to the motor frame 104. A spacer 105 is inserted between the stator 103 and the motor frame 104. The stator 103 is disposed coaxially with the bearing holding member 102.

Figure 8:
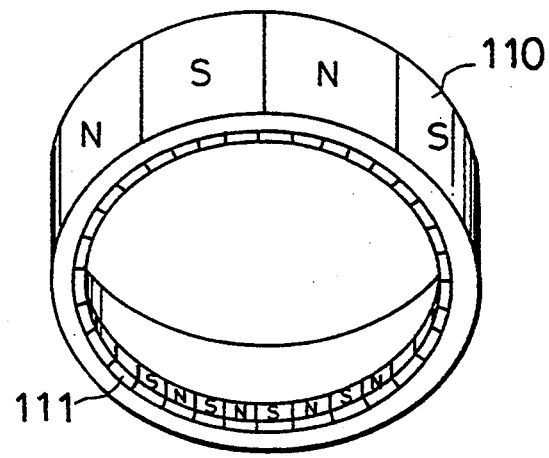
FIG. 8 is a perspective view of a driving permanent magnet.

Provided inside the stator 103 is a rotor 109 comprising a hub 108 which is pressure-fitted with or integrally molded with the rotary shaft 101, and a cylindrical yoke 107 which is formed of a ferromagnetic material and which is integrally formed with the hub 108. As is best seen in FIG. 8, an annular driving permanent magnet 110 is mounted on the outer surface of the yoke 107 and is magnetized in the radial direction to have alternate magnetic poles on the outer surface thereof to face the inner surface of the tooth portions 103s of the stator 103.

The driving permanent magnet 110 is formed by magnetizing, in the radial direction, the rotor 109 into a plurality of N- and S-poles arranged along the periphery. For example, the number of the magnetic poles is 24.

A signaling permanent magnet 111 is integrally and formed by magnetization in the axial direction to have alternate magnetic poles on the lower end of the cylindrical part of time rotor 109, i.e., the end farther away from the hub. The signaling permanent magnet 111 has a magnetization pattern for the purpose of FG for detecting the rotary angle or the rotating speed (the number of revolutions per unit time).

An FG detecting circuit pattern 112 is formed on a metallic circuit board 104, being spaced with a small gap from the signaling permanent magnet 111. As the rotor 109 rotates, the signaling permanent magnet 111 and the FG detecting circuit pattern 112 acts to produce a rotary signal proportional to the rotary speed.

Figure 6:
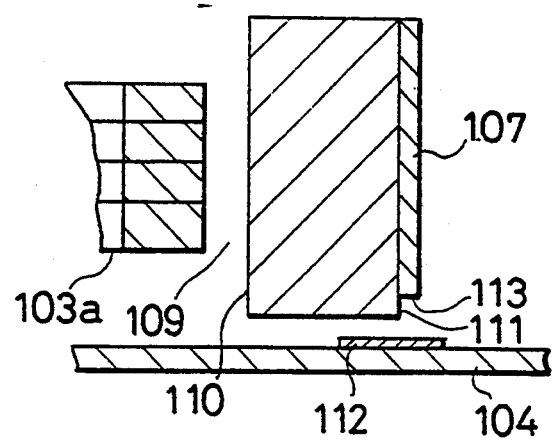
FIG. 6 is an enlarged sectional view along line I in FIG. 4.

The cut-away portion 113 of the yoke 107 in FIG. 6 is to prevent leakage of the magnetizing magnetic flux at the time of magnetization of the signaling permanent magnet, thereby to achieve effective magnetization.

Further elements of the electric motor are thrust stopper 114 mounted at the end of the rotary shaft 101 opposite to the hub 108, a sliding member 165 of a low coefficient of friction inserted between the hub 108 and the bearing holding member 102, and a drive pin 115 fixed to the hub 108 for rotation of the magnetic disk 1 similar to that shown in FIG. 1.

The above electric motor rotates and drives, by means of the hub 108, a magnetic disk 1 similar to that shown in FIG. 1, in the same way as the conventional electric motor. Accompanying the rotation of the rotor 109, and by the rotation of the signaling permanent magnet 111, the FG detecting pattern 112 generates a rotary signal proportional to the rotary speed of the rotor.

The electric motor is of the inner rotor type, and even when the thickness of the electric motor is reduced for reduction of the thickness of the magnetic recording device, there will be no problem of interference between the magnetic head and other components of the device and the rotor 109.

Moreover, since the signaling permanent magnet 111 is provided on the inner surface of the cylindrical rotor 109, it does not increase the dimension in the direction of the shaft, and it contributes to the reduction in the thickness of the magnetic recording device.

Figure 9:
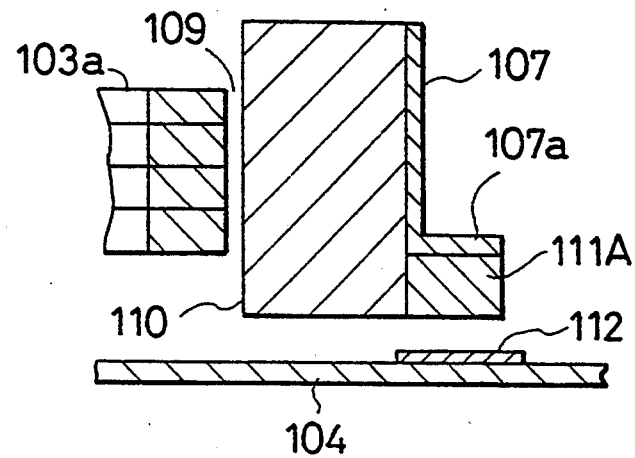
FIG. 9 is an enlarged sectional view of the pertinent portion of another embodiment of the invention.
Figure 7:
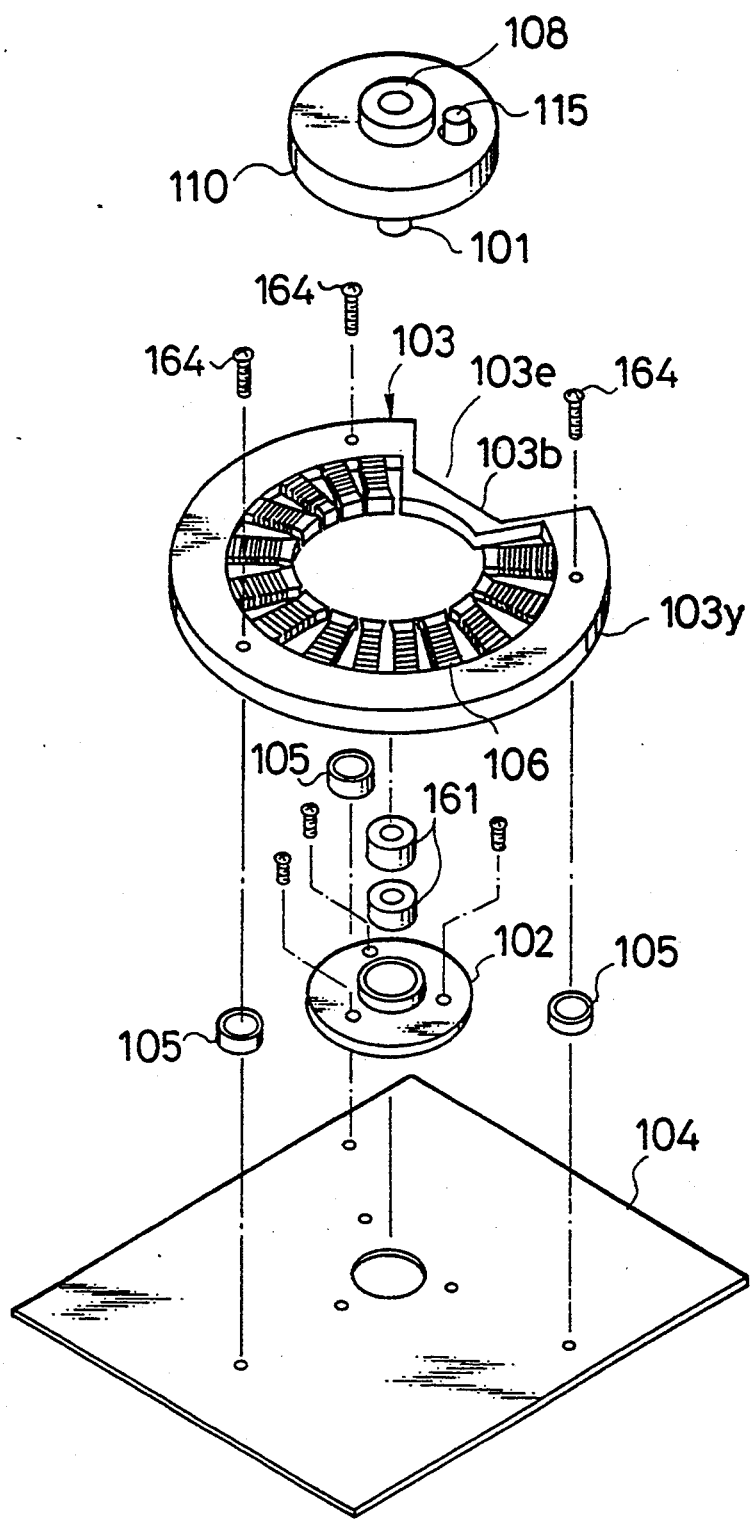
FIG. 7 is an exploded view of the electric motor.

FIG. 9 shows a modification of the signaling permanent magnet and its supporting structure. As illustrated, a flange 107a extending radially inward is provided at the lower end of the cylindrical yoke 107, and a signaling permanent magnet 111A which is a separate body from the driving permanent magnet 110 is fixed to the flange 107a. Since the dimension of the signaling permanent magnet in the direction of the shaft can be made adequate without increasing the dimension of the rotor and hence the motor in the direction of the shaft, the illustrated structure is advantageous where a large FG output is required. In this modification, the signaling permanent magnet 111A is a separate body from the driving permanent magnet 110. But they may be formed integrally.

Figure 10:
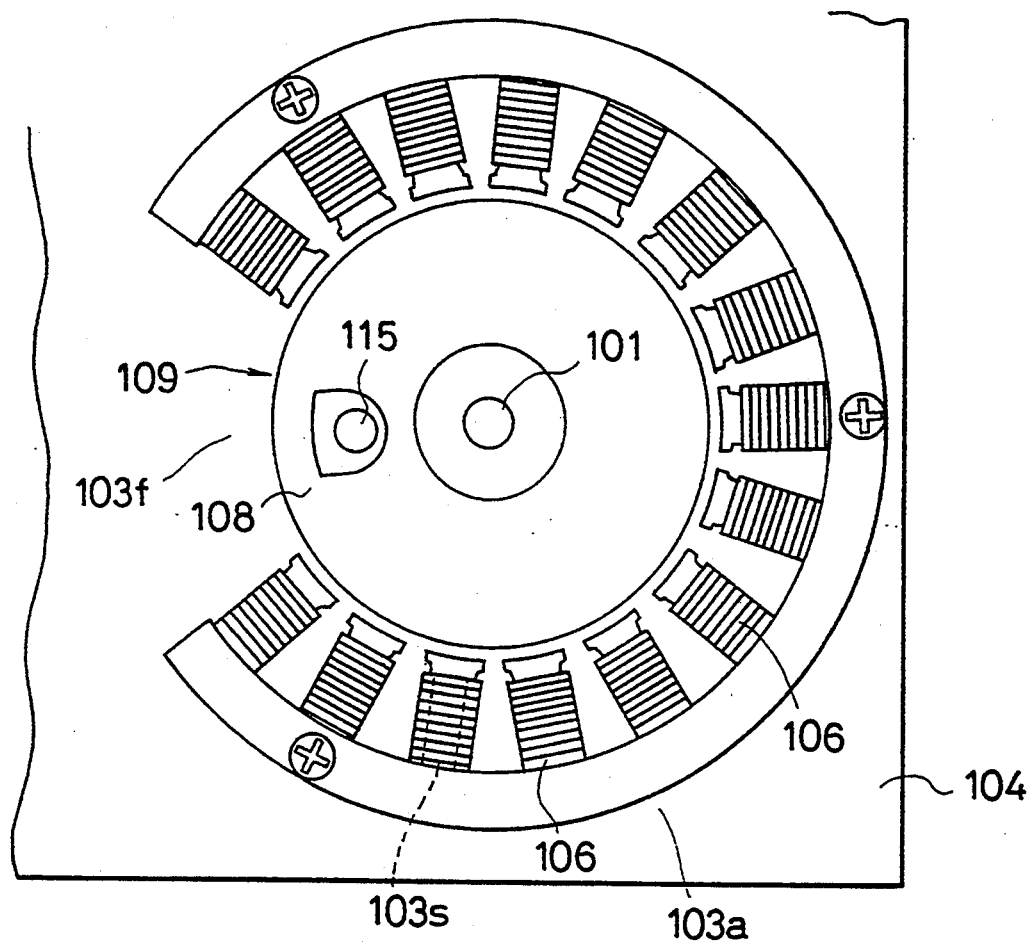
FIG. 10 is a plan view of an electric motor of a further embodiment of the invention.

FIG. 10 shows a modification of the stator in which the part of the annular part 103y where the tooth portions 103s are not provided are cut away. In other words, the smaller diameter portion 103b and the connecting portions 103e of the embodiment of FIG. 4 to FIG. 8 are not provided. The annular part 103y is therefore in the C-shape with an open part 103f.

In other respects, the embodiment of FIG. 10 is identical to the earlier described embodiments.

Figure 11:
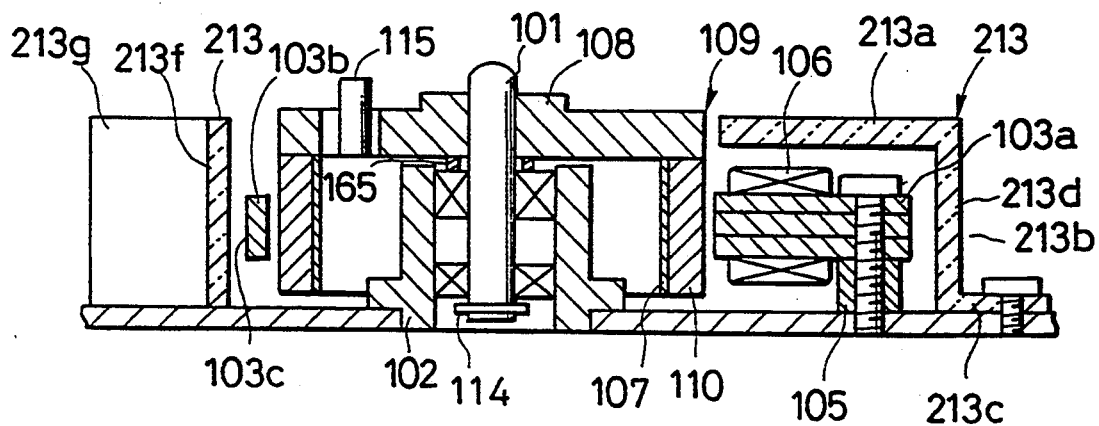
FIG. 11 is a sectional view of the electric motor of a further embodiment of the invention.

FIG. 11 shows another embodiment of the electric motor in which the upper part and the outer periphery part of the stator 103 are covered with a magnetic shielding member 213. The magnetic shielding plate 213 is provided to cover the coils 106 and the inner ends of the tooth portions 103s of the core 103a. The magnetic shielding plate 213 is provided with an annular part 213a provided on the side of the hub with respect to the stator coils, and a cylindrical part 213b having its upper end connected to the outer periphery of the annular part 213a, and tabs 213a extending radially outward from the lower end of the cylindrical part 213b. Screws extend through holes in the tabs 213c and threaded into the frame 104. Thus, the magnetic shielding plate 213 is mounted directly to the motor frame 104. The annular part 213a is provided with a circular aperture 312 defined by the inner periphery 313 of the annular part 213a. The aperture 312 permits passage of the rotary shaft 101 and the drive pin 115. The magnetic shielding plate 213 blocks any leakage of magnetic flux to the magnetic heads and a magnetic disk held on the hub 108, and protects the coils 106.

In other respects, the embodiment of FIG. 11 is identical to the earlier described embodiments.

In conformity with the concavity 103c of the stator 103, the magnetic shielding plate 213 is also provided with a concavity 213e. More specifically cylindrical part 213b comprises a larger diameter portion 213d which does not extend along the entire circumference, but extends over the larger diameter portion 103d of the stator 103, and a smaller diameter portion 213f covering the smaller diameter portion 103b of the stator 103, and connecting portions 213g extending radially to connect the ends of the larger diameter portion 213d and the smaller diameter portion 213f. The annular part 213a is accordingly shaped not in exactly annular form, but is provided with a cut away portion to conform to the cylindrical portion 213b so that the periphery of the annular portion 213 conforms to and is connected to the upper ends of the cylindrical portion 213b.

Advantages of having the concavity 213e (FIG. 11), the concavity 103c (FIG. 5) or the open part 103f (FIG. 10) in the above embodiment will now be explained.

In the application of the magnetic recording device, as shown in FIG. 12, magnetic heads 41 and 42 are capable of translation movement. The line of movement of the magnetic heads 41 and 42 is aligned with the concavity 213e, and the rotor 109, the stator 103, and the magnetic heads 41 and 42 are disposed in a substantially common plane. This will make it possible to reduce the thickness of the magnetic recording device.

In addition, since part of the core 103a is provided with the concavity 103c or the open part 103f, there is a significant imbalance in the forces acting on the driving permanent magnet of the rotor 109 in the radial directions, and a biasing force acts on the bearing at all times in a specific direction so vibration of the shaft can be prevented.

Figure 13:
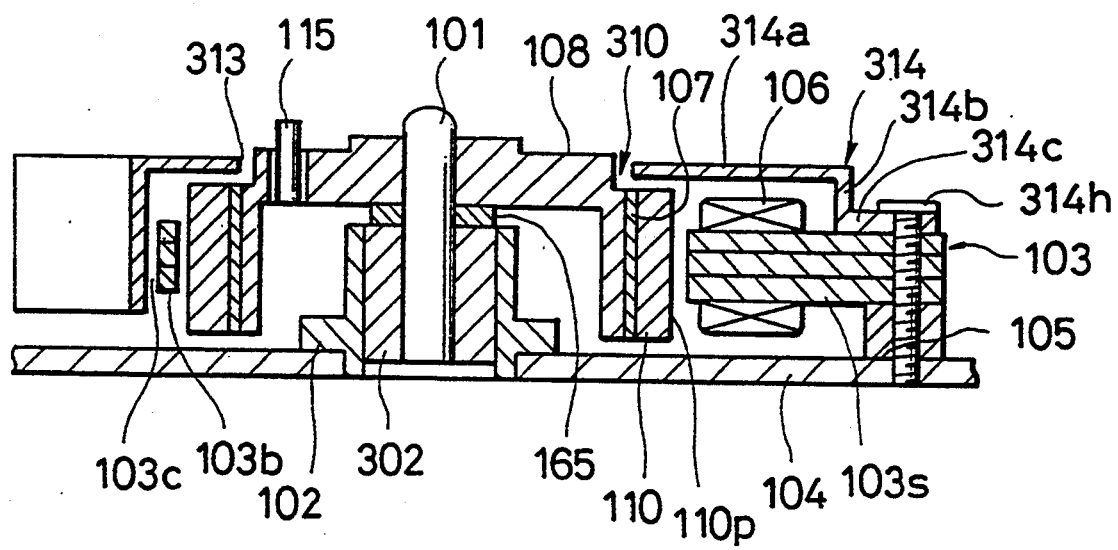
FIG. 13 is a sectional view of an electric motor of an embodiment of the invention.
Figure 14:
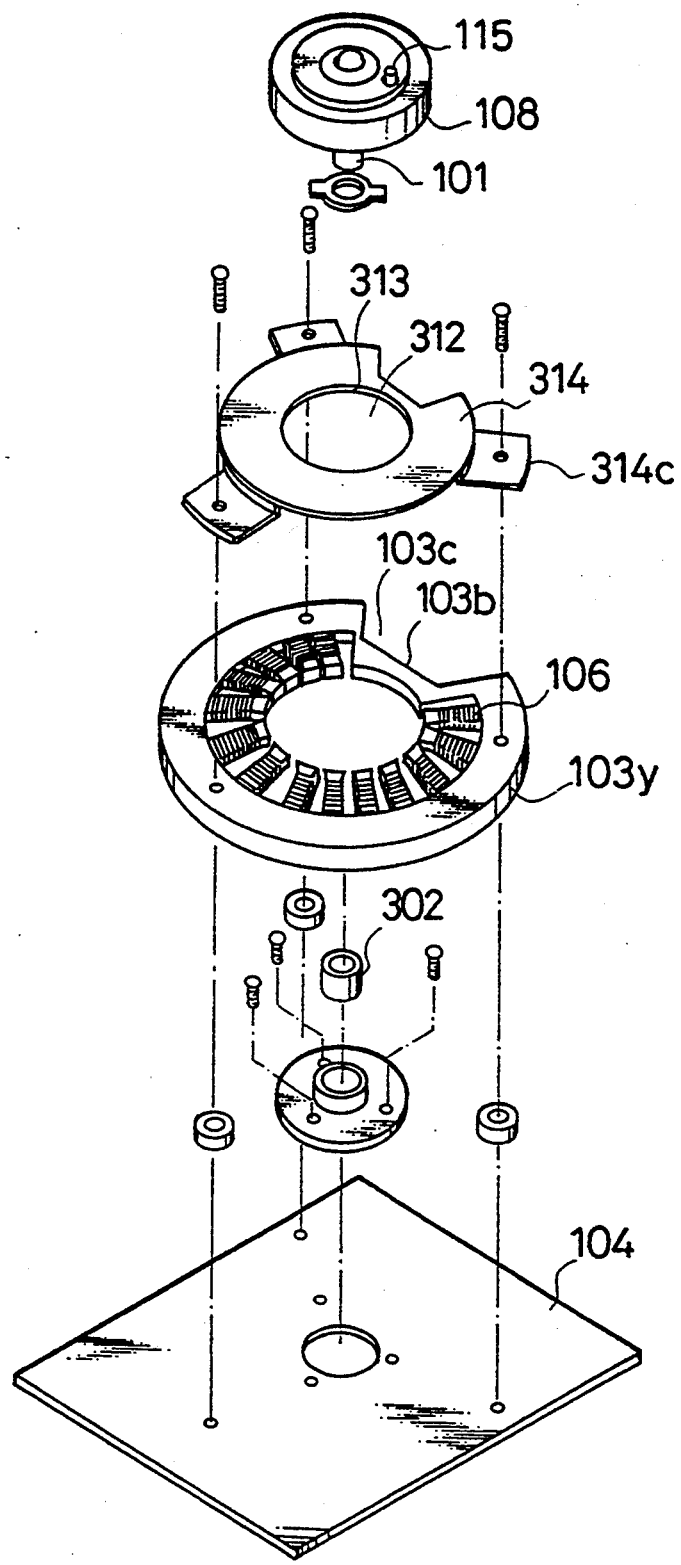
FIG. 14 is an exploded perspective view of the motor.
Figure 15:
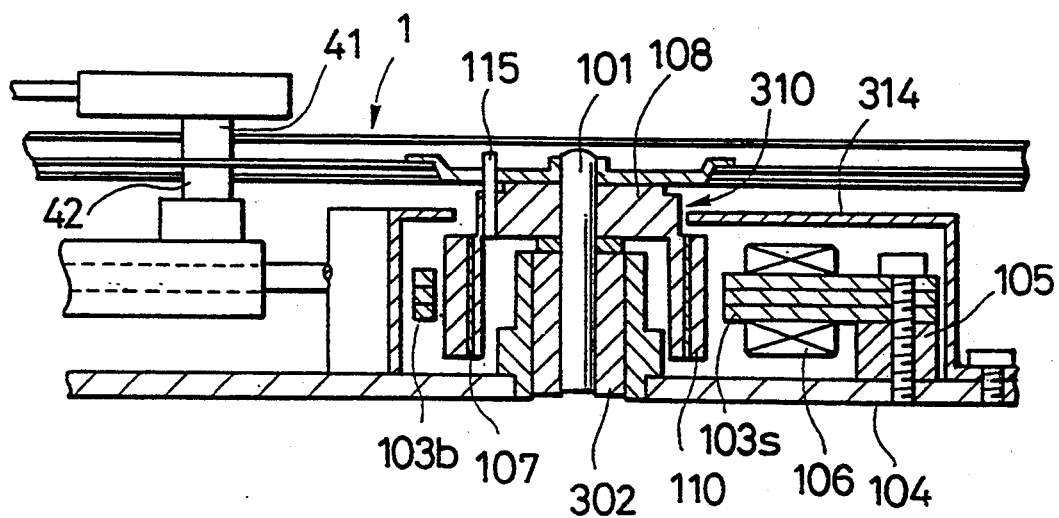
FIG. 15 is a sectional view showing the electric motor incorporated in a magnetic recording device.

FIG. 13 to FIG. 15 show a further embodiment of the invention. In this embodiment, the radius of the circular aperture 312 of the magnetic shielding plate 314 is smaller than the radius of the rotor 310.

More specifically, the magnetic shielding plate 314 comprises an annular part 314a, a cylindrical part 314b, and tabs 314c. The annular part 314a is provided with an aperture 312 defined by the inner periphery 313 of the annular part 314a. The radius of the inner periphery 313 is smaller than the radius of the outer surface 110p of the driving permanent magnet 110 of the rotor.

The magnetic shielding plate 314 is fastened, at its several mounting tabs 314c formed on its outer periphery, to the core 303a by means of screws 314h, by which the core 103a is also fastened to the motor frame 104 via a spacer 105.

FIG. 16 to FIG. 19 show other embodiments of the magnetic shielding plate.

Figure 16:
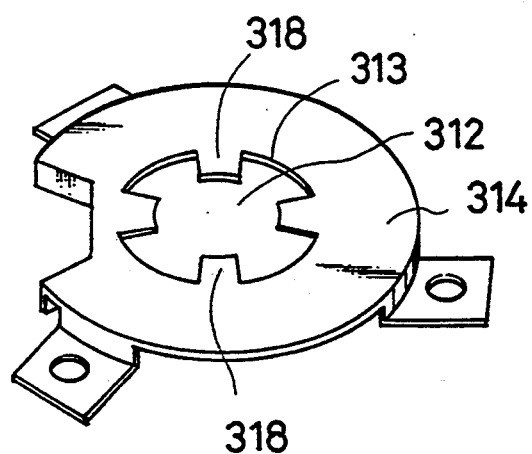
FIG. 16 and FIG. 17 are other embodiments of the magnetic shielding plate.

The magnetic shielding plate 314 of FIG. 16 is so configured that protrusions 318 are formed at several locations of the inner periphery 313 of the aperture 312. The inner extremities of the protrusions 318 are positioned closer to the rotary shaft 101 than the outermost periphery of the permanent magnet 309 of the rotor 310. With this configuration, the magnetic shielding plate 314 confronts the permanent magnet 110 of the rotor only at the protrusions 318, rather over the entire inner periphery. As a result, the area of the magnetic shielding plate 314 confronting the driving permanent magnet 110 is reduced, so is the magnetic attracting force acting on the magnetic shielding plate 314. Sticking of the magnetic shielding plate 314 to the rotor 310 due to the magnetic attraction is thereby avoided.

Another difference of this embodiment from the previously described embodiment is that in place of the ball bearings 161, a plain bearing 302, e.g., oil-impregnated sintered bearing, is used. It is supported by the bearing holding member 102. A sliding member 443 of a low coefficient of friction is inserted between the hub 108 and the oil-impregnated sintered bearing 302. Use of a plain bearing is advantageous in that the shaft can be supported over a long distance along its length with a simple construction, and with a smaller dimension in the radial direction.

In other respects, the embodiment of FIG. 16 is identical to the earlier described embodiments.

Figure 17:
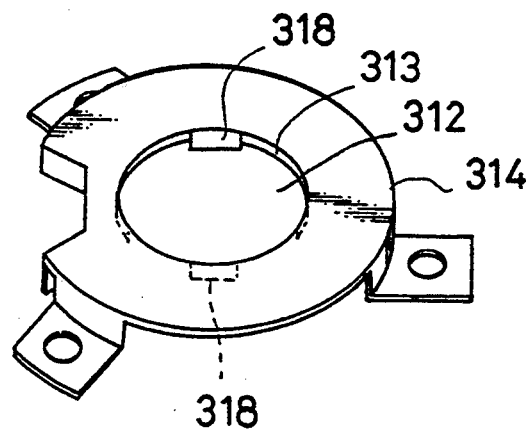

The magnetic shielding plate 314 of FIG. 17 is so configured the protrusions 318 formed at several locations of the inner periphery 313 of the aperture 312 are bent in to the direction parallel with the shaft 101 and downward as seen in the figure, i.e., away from the hub. The tips of the protrusions 318, rather than the entirety of the protrusions 318 are in confrontation with the the driving permanent magnet 310, so the area of the magnetic shielding plate confronting the permanent magnet 310 of the rotor is further reduced.

Figure 18:
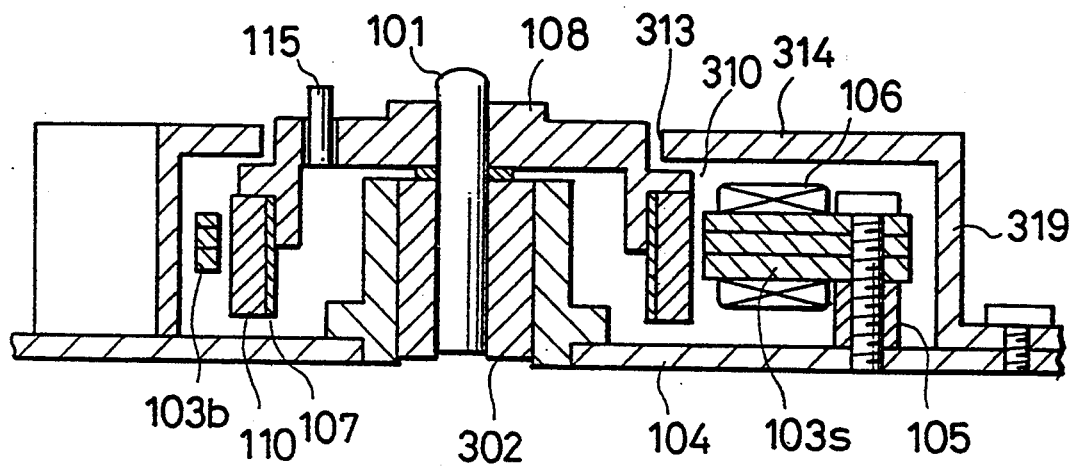
FIG. 18 is a sectional view showing a further embodiment of the invention.
Figure 19:
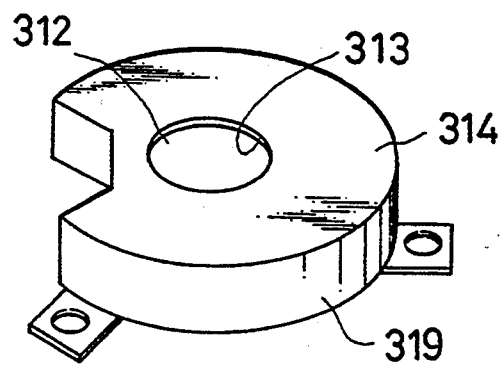
FIG. 19 is a perspective view showing a magnetic shielding plate of FIG. 18.

The magnetic shielding plate 314 shown in FIG. 18 and FIG. 19 is similar to the magnetic shielding plate in the embodiment of FIG. 11. That is, it is provided with a cylindrical part 319 having its upper end connected to the outer periphery of the annular to part 314a, and tabs 319a extending radially outward from the lower end of the cylindrical part 319. Screws extend through holes in the tabs 319a and are threaded into the frame 304. Thus, the magnetic shielding plate 314 is mounted directly to the motor frame 304, as opposed to the magnetic shielding plate of the embodiments of the FIG. 16 and FIG. 17.

It will be seen that according to the embodiments of FIG. 16 to FIG. 19, part or entirety of the inner periphery 313 of the magnetic shielding plate 314 is positioned closer to the rotary shaft than the outermost periphery of the rotor 310, so that the magnetic shielding plate 314 serves to prevent escape of the rotor 310 in the direction of the rotary shaft. This will eliminate the need for a separate part for preventing the escape of the rotor in the shaft direction, and thereby simplify the configuration and reduces the cost of the electric motor.

Figure 20:
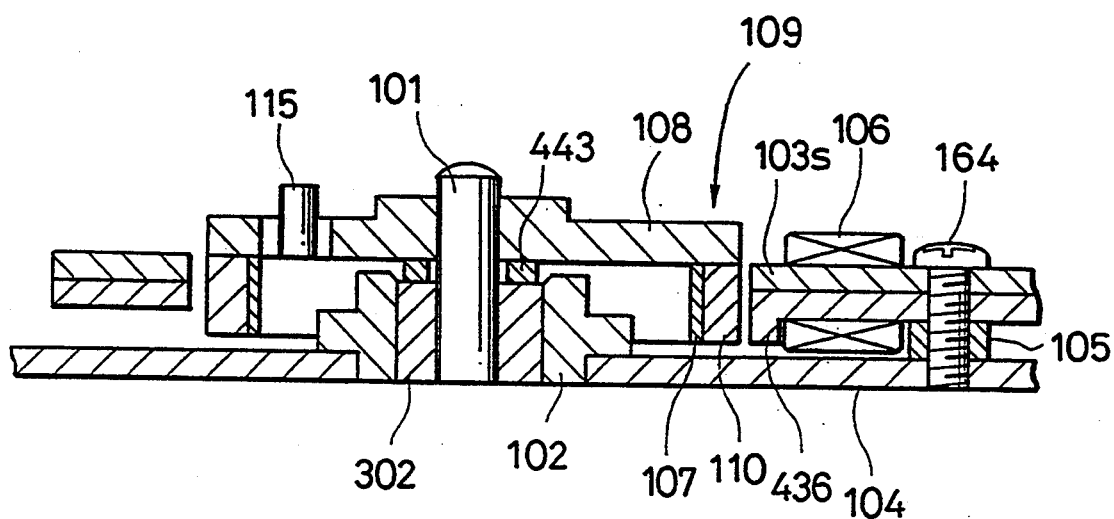
FIG. 20 is a sectional view showing an electric motor of the first embodiment of the invention.

FIG. 20 is a sectional view showing an electric motor of a further embodiment of the invention.

The stator of this embodiment comprises bent portions extending from the inner extremities of the tooth portions 103s of the core 103a. The bent portions extend in the direction parallel with the shaft 101, and downward as seen in the figure, i.e., away from the hub.

The bent portions 436 are formed by bending one of a plurality of the laminated sheets of the stator core 103a.

In other respects, the embodiment of FIG. 20 is identical to the earlier described embodiments.

With the bent portions 436, the area of the stator core 103a confronting the permanent magnet of the rotor is increased. This will reduces the magnetic resistance across the air gap between the extremities of the tooth portions of the core 103a and the poles of the permanent magnet of the rotor, and increase the magnetic flux through the air gap, and accordingly, the torque generated by the interaction of the stator and the rotor.

Another advantage derived from the provision of the bent portions 436 is that the magnetic attraction between the stator and the rotor serves to create a force acting on the rotor downward, i.e., in the direction away from the hub. This force counteracts the thrust force acting on the rotor in the direction of the rotary shaft 21 due to the rotation of the rotor. Accordingly, the entire rotor is prevented from shifting in the direction of the rotary shaft 21.

It is therefore possible to avoid adverse effects on the recording and playback. As a result, a reliable, stable, and thin electric motor can be obtained.

In the embodiment described, the bent portion is formed throughout the entire circumference of the core 103a, i.e., on all the tooth portions 103s. However, the bent portions may alternatively be provided over part only of the circumference of the stator core 103a, i.e., some only of the tooth portions 103s.

Figure 21:
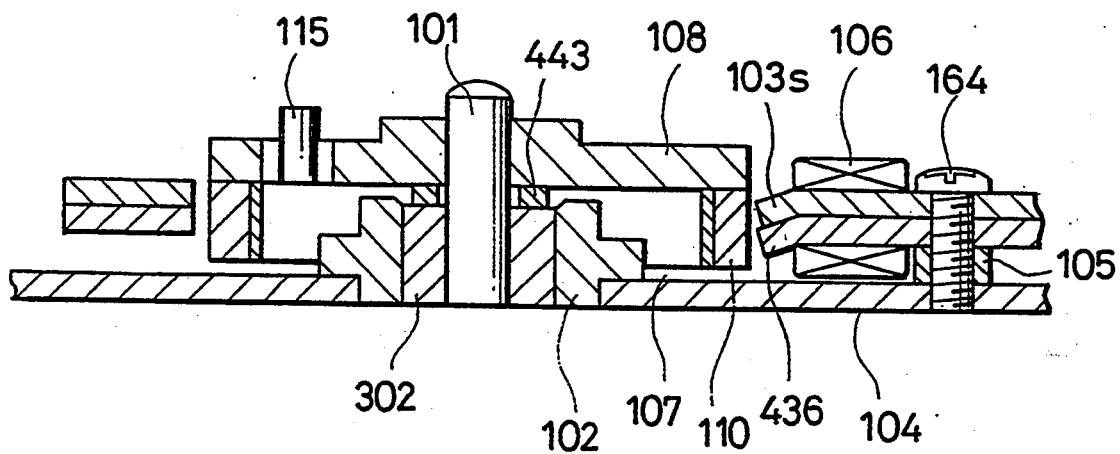
FIG. 21 is a sectional view of an electric motor of the second embodiment of the invention.

FIG. 21 is a sectional view showing an electric motor of a further embodiment of the invention. In the figure, reference numerals and marks identical to those used in connection with the earlier described embodiments denote identical or corresponding parts.

The bent portion 436 of this embodiment extends from the inner extremities of the tooth portions 103s of the stator core 103a obliquely downward. The bent portions 436 are formed by bending a plurality of the laminated sheets of the stator core 103a.

In other respects, the embodiment of FIG. 21 is identical to the embodiment of FIG. 20.

With the structure of tills embodiment, advantages similar to those described in connection with the embodiment of FIG. 20 are obtained.

Figure 22:
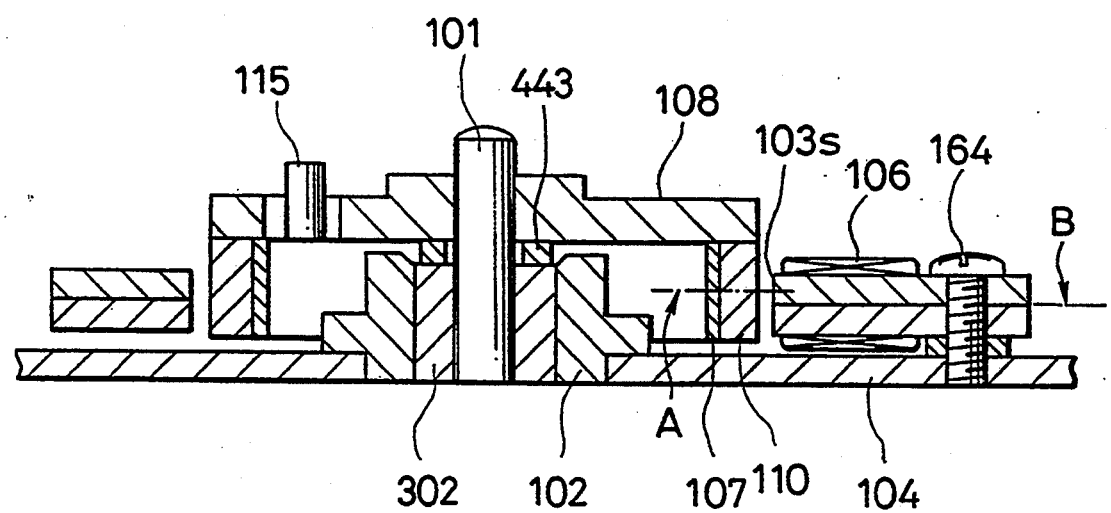
FIG. 22 is a sectional view of an electric motor of the third embodiment of the invention.

FIG. 22 is a sectional view showing an electric motor of a further embodiment. In the figure, reference numerals and marks identical to those used in connection with the earlier described embodiments denote identical or corresponding parts.

In the figure, reference mark A denotes a midpoint of the driving permanent magnet in the direction of the shaft 101, and B denotes the midpoint of the stator core 103a, particularly, the inner extremities of the tooth portions of the stator core 103a in the direction of the shaft of the stator core 103a. The midpoint B in the direction of the shaft of the stator core 103a is lower than the midpoint A of the driving permanent magnet 110 in the direction of the shaft 101.

In other respects, this embodiment is identical to the embodiments FIG. 20 and FIG. 21.

Because the midpoint B in the direction of the shaft of the stator core 103a is lower than the midpoint A of the permanent magnet 110 in the direction of the shaft 101, the magnetic attraction between the stator and the rotor creates a force acting downward, to counteract the thrust force due to the rotation of the rotor. The entire rotor is therefore prevented from shifting in the direction of the rotary shaft 21. It is therefore possible to avoid adverse effects on the recording and playback. As a result, a reliable, stable, and thin electric motor can be obtained.

An advantage of the embodiment of FIG. 22 over the embodiments of FIG. 20 and FIG. 21 is that the bent portions 436 can be omitted, and the structure and the fabrication of the electric motor are simpler.

What is claimed is:

1. An electric motor comprising:
   a rotary shaft that is rotatably supported;
   a rotor having an annular driving permanent magnet generating a magnetic flux in the radial direction, and rotating together with said rotary shaft the rotor further comprises a hub fixed to said rotary shaft;
   a stator disposed outside the rotor, having a core and a plurality of coils wound on the core, and generating a rotating torque for the rotor by the interaction with the driving permanent magnet;
   means for detecting the rotary angle or the rotational speed of the rotor,
   said means comprises a signaling permanent magnet having a length less than the length of the driving permanent magnet, provided on only a lower radially inner side of the driving permanent magnet at an end farther away from said hub wherein said signaling permanent magnet is formed by magnetization in the axial direction; and
   said means further includes an FG detecting circuit formed on a circuit board spaced with a gap from the signaling permanent magnet to interact with the signaling permanent magnet.

2. The electric motor of claim 1, wherein said core comprises an annular part and tooth portions extending radially inward from the inner surface of the annular part, and said coils are wound on the tooth portions.

3. The electric motor of claim 2, wherein all said tooth portions are bent.

4. The electric motor of claim 1, wherein said driving permanent magnet has alternate magnetic poles on the outer surface thereof to face the inner surface of the core.

5. The electric motor of claim 1, wherein said rotor further comprises an annular yoke fixed to said hub; and said annular permanent magnet is mounted on the outer surface of the annular yoke.

6. The electric motor of claim 5, wherein said signaling permanent magnet has poles on its end farther away from said hub.

7. The electric motor of claim 1, wherein said shaft is rotatably supported for movement by ball bearings.

* * * * *